United States Patent [19]

Hay et al.

[11] Patent Number: 4,590,482
[45] Date of Patent: May 20, 1986

[54] NOZZLE TEST APPARATUS AND METHOD FOR THERMAL INK JET SYSTEMS

[75] Inventors: Robert R. Hay, Boise; Paul R. Spencer, Meridian, both of Id.

[73] Assignee: Hewlett-Packard Company, Palo Alto, Calif.

[21] Appl. No.: 561,604

[22] Filed: Dec. 14, 1983

[51] Int. Cl.⁴ ............................................. G01D 18/00
[52] U.S. Cl. ................................. 346/1.1; 346/140 R
[58] Field of Search ........................ 346/140 R, 75, 1.1

[56] References Cited

U.S. PATENT DOCUMENTS

| | | | |
|---|---|---|---|
| 4,241,357 | 12/1980 | Anestos | 346/140 |
| 4,323,905 | 4/1982 | Reitberger | 346/75 |
| 4,389,657 | 6/1983 | McMahon | 346/140 |
| 4,484,199 | 11/1984 | Watanabe | 346/140 X |

Primary Examiner—Joseph W. Hartary
Attorney, Agent, or Firm—William H. MacAllister; William J. Bethurum

[57] ABSTRACT

Apparatus and method for testing and determining the operating status of a plurality of ink-ejecting nozzles in a thermal ink jet array. An electrically conductive plate is placed adjacent the ink-ejecting orifices in a test position. An ink droplet appearing from an orifice will, for some brief moment, be in contact with both the orifice plate and the electrically conductive plate. The droplet completes a circuit with a conduction detector and allows current to flow thereby indicating an operative nozzle.

2 Claims, 3 Drawing Figures

NOZZLE TEST APPARATUS AND METHOD FOR THERMAL INK JET SYSTEMS

BACKGROUND OF THE INVENTION

The rapidity of modern-day data processing imposes severe demands on the ability to produce a printout record at very high speed. Impact printing, in which permanently shaped character elements physically contact a recording medium, are proving to be too slow, too bulky, and too noisy for many applications. Thus, the industry has turned to other alternatives involving non-impact printing schemes using various techniques to cause a desired character to be formed on the recording medium. Some of these involve the use of electrostatic or magnetic fields to control the deposition of a visible character-forming substance, either solid (i.e., dry powder) or liquid (i.e., ink) on the medium which is usually paper. Other systems utilize electrophotographic or ionic systems in which an electron or ion beam impinges on the medium and causes a change in coloration at the point of impingement. Still another system employs a thermal image to achieve the desired shape coloration change. Of more recent import is a printing technique, called ink jet printing, in which tiny droplets of ink are electronically caused to impinge on a recording medium to form any selected character at any location at high speed. Ink jet printing is a non-contact system which requires no specially treated recording media, ordinary plain paper being suitable, and which requires no vacuum equipment or bulky mechanisms. The present invention relates to this kind of printing system.

Ink jet systems may be classified as follows: (1) continuous, in which ink droplets are continuously spewed out from a nozzle at a constant rate under constant ink pressure; (2) electrostatic, in which an electrically-charged ink jet is impelled by controllable electrostatic fields; and (3) impulse, or ink-on-demand, in which ink droplets are impelled on demand from a nozzle by a controllable mechanical force. The invention is concerned with a nozzle head for this latter type of system.

Typical of the ink-on-demand systems is the approach set forth in U.S. Pat. No. 3,832,579 entitled PULSED DROPLET EJECTING SYSTEM. Here a cylindrical piezoelectric transducer is tightly bound to the outer surface of a cylindrical nozzle. Ink is delivered to the nozzle by means of a hose connected between one end of the nozzle and an ink reservoir. As the piezoelectric transducer receives an electrical impulse, it squeezes the nozzle which in turn generates a pressure wave resulting in the acceleration of the ink toward both ends of the nozzle. An ink droplet is formed when the ink pressure wave exceeds the surface tension of the meniscus at the orifice on the small end of the nozzle.

Another type of ink-on-demand printing is described in U.S. Pat. No. 3,179,042 entitled SUDDEN STEAM PRINTER. This system utilizes a number of ink-containing tubes, electric current being passed through the ink itself. Because of the high resistance of the ink, it is heated so that a portion thereof is vaporized in the tubes causing ink and ink vapor to be expelled from the tubes.

In the co-pending application, Ser. No. 292,841 entitled THERMAL INK JET PRINTER, filed Aug. 14, 1981 now abandoned by John L. Vaught et al. and assigned to the instant assignee, an ink-on-demand printing system is described which utilizes an ink-containing capillary having an orifice from which ink is ejected. Located closely adjacent to this orifice is an ink-heating mechanism which may be a resistor located either within or adjacent to the capillary. Upon the application of a suitable current to the resistor, it is rapidly heated. A significant amount of thermal energy is transferred to the ink resulting in vaporization of a small portion of the ink adjacent the orifice and producing a bubble in the capillary. The formation of this bubble in turn creates a pressure wave which propels a single ink droplet from the orifice onto a nearby writing surface or recording medium. By properly selecting the location of the ink-heating mechanism with respect to the orifice and with careful control of the energy transfer from the heating mechanism to the ink, the ink bubble with quickly collapse on or near the ink-heating mechanism before any vapor escapes from the orifice.

It is important to be able to monitor the condition and/or operability of the various nozzles in a thermal ink jet printhead system. It is highly desirable to detect in a very short period of time and almost instantly during the "printing" process whether any particular nozzle is operative or inoperative. It is further desirable to perform such a test during the printing operation itself with a minimum amount of delay to the operation. The need for detecting the nozzle failure is extremely critical in thermal jet print systems utilizing an array of nozzles which may total as many as 256 or more.

SUMMARY OF THE INVENTION

The present invention provides means and methods for rapidly testing and determining the operating status of a plurality of ink-ejecting nozzles in an array. Failure of a particular nozzle to eject ink may be due to clogging in the ejection orifice or to resistor degradation whereby the resistive heater no longer generates sufficient thermal energy to eject an ink droplet from the corresponding orifice. The present invention achieves its ends by rapidly moving the printhead apparatus from the "print" position to a "test" position and by utilizing an electrically conductive ink. Adjacent to the ink-ejecting orifice when the printhead is in the test position is an electrically conductive member. Electrical connections to this member and to the electrically conductive orifice plate in which the nozzle is located are provided to a conduction detector. Upon "firing" a nozzle in the printhead, "firing" being a term of art referring to applying an electrical pulse to the resistive element, an ink droplet will either appear or not appear and be ejected. If the nozzle is properly operative, the ink droplet, which is electrically conductive, will for some brief moment be in contact with both the orifice plate and the electrically conductive test plate. The electrically conductive ink droplet thus completes the circuit with a conduction detector and allows current to flow thereby indicating an operative nozzle.

DETAILED DESCRIPTION OF THE INVENTION

Figure 1:
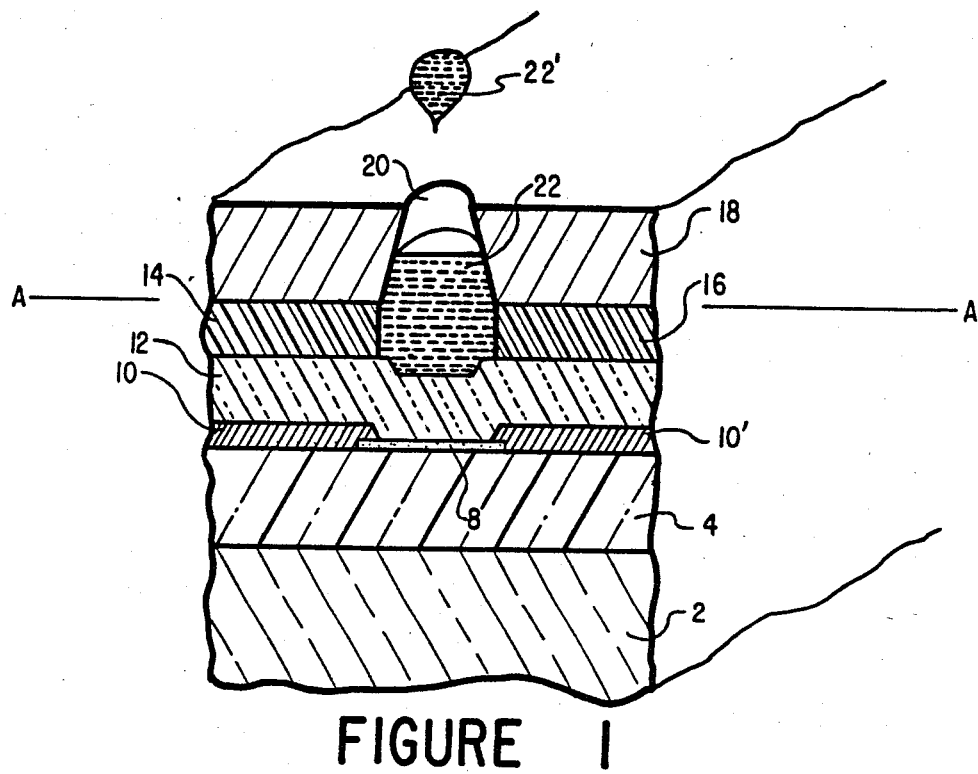
FIG. 1 is a side view in section of a typical thermal ink jet printhead.

Referring now to the drawings and to the FIG. 1, in particular, there is shown a portion of the printhead embodying a single orifice and the structure associated therewith. The principal support structure is a substrate 2 of single crystalline silicon. Disposed on the upper surface of the silicon substrate 2 is a thermally insulating layer 4 of silicon dioxide which may typically be 3.5 microns in thickness. Next, a layer 6 of electrically resistive material is formed over the layer 4 of silicon dioxide. The resistive layer 6 may be of tantalum from 4,000 to 5,500 angstroms in thickness, for example. An active resistive element or area 8 is provided between electrically conductive elements 10, 10' which may be formed of aluminum, for example. It will be appreciated that in the embodiment described the resistive layer 8 may be continous over the entire surface of the underlying silicon dioxide layer 4. The "active" resistive area 8 is the portion of the resistive layer lying between the conductor strips 10, 10'.

The next structure disposed over the resistive element 8 and its associated conductors 10 and 10' is a passivation layer 12 formed by anodizing the surface portions of the resistive element and the conductor strips 10, 10'. The portion of the layer 12 in immediate contact with the resistive element 8 thus may be tantalum oxide and the portions of the layer 12 in immediate contact with the conductors 10, 10' may be aluminum oxide.

Figure 2:
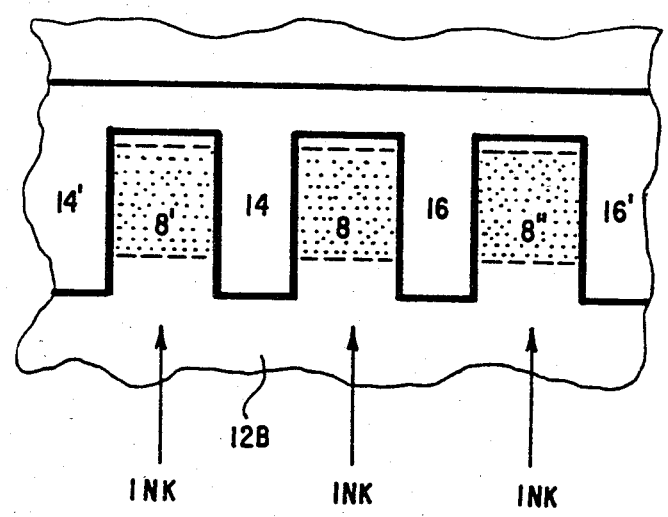
FIG. 2 is a plan view of a portion of a printhead as if taken along the line A—A in FIG. 1.

Disposed on the upper surface of the passivation layer 12 are barrier elements 14 and 16. The barrier elements may comprise organic plastic material such as RISTON or VACREL. These barriers may take various configurations. As shown in FIG. 1, they are formed on each side of the underlying resistor element 8. As shown in FIG. 2, these barrier structures may surround each resistive element on three sides. The barriers 14 and 16 serve to control refilling and collapse of the bubble, as well as minimizing cross-talk between adjacent resistors. The particualr materials RISTON and VACREL are organic polymers manufactured and sold by E. I. DuPont de Nemours and Company of Wilmington, Del. These materials have been found to possess good adhesive qualities for holding the orifice plate 18 in position on the upper surface of the printhead assembly. In addition, both materials can withstand temperatures as high as 300 degrees centigrade.

The orifice plate 18 may be formed of Nickel. As shown, the orifice 20 itself is disposed immediately above and in line with its associated resistive element 8. While only a single orifice has been shown, it will be understood that the complete printhead may comprise an array of orifices each having a respective underlying resistive element and conductors to permit the selective ejection of a droplet of ink from any particular orifice. With particular reference to FIG. 2, it will be appreciated that the barriers 14 and 16 serve to space the orifice plate 22 above the passivation layer 12 permitting ink to flow in this space and between the barriers so as to be available in each orifice and over and above respective resistive elements 8, 8' and 8''.

Upon energization of the resistive element 8, the thermal energy developed thereby is transmitted through the passivation layer 12 to heat and vaporize a portion of the ink 22 disposed in the orifice 20 and immediately above the resistive element 8. The vaporization of the ink 22 eventually results in the expulsion of a droplet 22' of ink which impinges upon an immediately adjacent recording medium (not shown). The bubble of ink formed during the heating and vaporization thereof then collapses back onto the area immediately above the resistive element 8. The resistor 8 is protected from any deleterious effects due to collapse of the ink bubble by means of the passivation layer 12.

In fabricating the printhead structure according to the invention, it will be appreciated that the particular geometry of any particular element or layer may be achieved by techniques well known in the art of film deposition and formation. These techniques involve the utilization of photo-resists and etching procedures to expose desired areas or geometries where an element is to be formed, followed by the deposition or etching of the material of which the particular element is to be formed. These processes for forming the various layers and elements of the printhead assembly are well known in the art and will not be described in greater detail herein.

Figure 3:
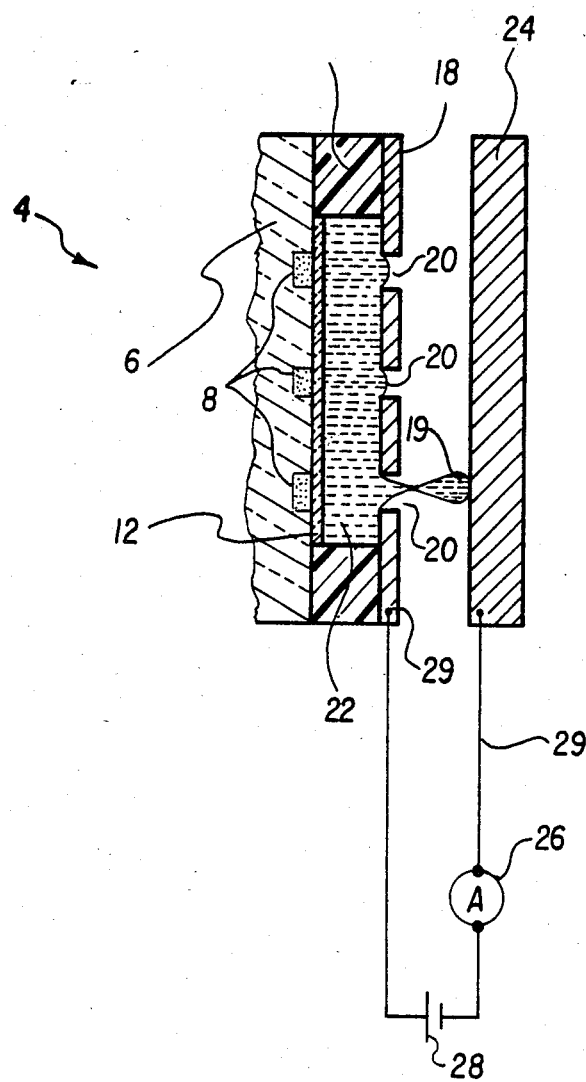
FIG. 3 is a side view, partly in section and partly schematic, of printhead and the test apparatus therefor according to the present invention.

Referring now to FIG. 3, a portion of a printhead assembly 4 is shown comprising the substrate 6, resistive elements 8, a passivation layer 12, barrier members 14, and an orifice plate 18 having a number of orifices 20 therein in alignment with and associated with discrete resistive elements 8. Between the orifice plate and the passivation layer 12 is a supply of ink 22. It will be noted that there is a supply of ink immediately over each resisitive element and adjacent to a respective orifice 20. The printhead assembly 4 is shown as being in the test position. As such, it is adjacent an electrically conductive member 24 which may be in the form of a plate. The electrical conductor 24 alternatively could be composed of absorbent material which is electrically conductive. The advantage of using absorbent material instead of a flat plate-like member lies in the fact that the absorbent material will absorb the ink that is utilized during the test procedure. The use of a plate on which ink impinges results in the ink running down and dripping off of the plate and requires additional provision for its collection. The electrically conductive member 24 is electrically connected to a source 28 of electrical voltage through a connection 29. As the printhead assembly 4 is moved into the test position, the electrically conductive orifice plate 18 is electrically connected to the power supply 28 through a contact 29'. Connected in series with the electrical power supply 28 is a conduction detector 26, which may be an ammeter.

With the printhead in the test position, pulses of current are sequentially applied to each of the resistive elements 8 causing the sequential formation of a droplet 19 of ink which contacts the electrically conductive member 24 before separating from the main body of ink 22. Since the ink is electrically conductive, current will flow through the ink droplet 19 and an indication of this conductivity will be displayed or detected by the conduction detector member 26. On the other hand, if no droplet is formed for a particular resisitor orifice, it will be apparent that the orifice or its associated resistor may be malfunctioning for one reason or another. There could, for example, be a failure of the resistive element itself or the orifice may have become clogged and the passage or emission of ink therethrough is no longer possible. At any rate, the failure to indicate conductivity for any particular nozzle or orifice immediately indicates that this nozzle is in a failure mode and corrective action may be taken before the printhead assembly 4 is returned to its operating position.

Since most of the dyes utilized in formulating inks are salts, solutions of these dyes are electrically conductive. Thus, it has been found that many of the inks currently utilized in thermal ink jet printers are sufficiently conductive for ready adaptation and use in the test apparatus and procedure of the present invention. Typical of these conductive inks is one made with a water base solvent and a sodium salt dye.

In a typical printhead assembly, there may be 256 orifice-nozzles that require testing. Assuming 100 microseconds for firing each resistor, the total test for an array of 256 nozzles will take about 25.6 milliseconds. A typical procedure would be to move the printhead assembly 4 to the test station and perform the test once at the end of each page of printing.

There thus has been described an efficient, effective, and rapid procedure for testing the condition of a large number of ink jet print nozzles.

What is claimed is:

1. Apparatus for testing a thermal ink jet printhead assembly of the type having an electrically conductive printhead member containing a plurality of nozzles adapted to selectively eject conductive ink therefrom, said apparatus comprising electrically conductive means disposed adjacent said printhead member and having an ink absorbent surface for receiving ink sequentially from all of said plurality of nozzles spaced across a print head member, said ink absorbing surface facing all of said nozzles being tested and spaced a chosen distance therefrom and adapted to receive and come into electrical contact with said ejected ink from said nozzles while said ink is still in contact with said electrically conductive printhead member, circuit means for connecting said electrically conductive printhead member and said electrically conductive means to a voltage source, and means associated with said circuit means for indicating the flow of current in said circuit means.

2. The method of testing the operability of nozzles for ejecting electrically conductive ink from a thermal ink jet printhead comprising the steps of:

(1) making electrical contact to said electrically conductive ink in said printhead;

(2) ejecting a portion of said ink from one of said nozzles;

(3) applying a voltage between said ink in said printhead and electrically conductive means for receiving said ejected portion of said ink;

(4) and detecting the presence or absence of current flow between said ink in said printhead and said electrically conductive means for receiving said ejected portion of said ink, and paragraph (5) sequentially ejecting ink from a plurality of nozzles to a common surface of said electrically conductive means, whereby all nozzles in single print head may be rapidly tested by moving said print head into a test position with respect to one surface of said electrically conductive means and by sequentially firing resistive elements associated respectively with said nozzles.

* * * * *